(12) United States Patent
Ball et al.

(10) Patent No.: US 7,587,707 B2
(45) Date of Patent: Sep. 8, 2009

(54) PREDICATE ABSTRACTION VIA SYMBOLIC DECISION PROCEDURES

(75) Inventors: Thomas J. Ball, Mercer Island, WA (US); Shuvendu K. Lahiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 11/172,760

(22) Filed: Jul. 1, 2005

(65) Prior Publication Data

US 2007/0005633 A1    Jan. 4, 2007

(51) Int. Cl.
*G06F 9/44* (2006.01)
(52) U.S. Cl. .................. 717/117; 717/106; 717/114
(58) Field of Classification Search .......... 717/124, 717/140, 144, 146, 151, 106, 104, 131, 136
See application file for complete search history.

(56) References Cited

U.S. PATENT DOCUMENTS

| | | | |
|---|---|---|---|
| 6,745,384 B1 * | 6/2004 | Biggerstaff | 717/156 |
| 2003/0204834 A1 * | 10/2003 | Ball et al. | 717/106 |
| 2004/0006451 A1 * | 1/2004 | Bharadwaj et al. | 703/2 |
| 2004/0049474 A1 * | 3/2004 | Shankar et al. | 706/46 |

OTHER PUBLICATIONS

Ganzinger et al., The Saturate System, Dec. 4, 2002, pp. 1-38.*
Ball et al., "Zapato: Automatic Theorem Proving for Software Predicate Abstraction Refinement," *Proc. Of Computer Aided Verification (CAV '04)*, Boston, 4 pp. (Jul. 2004).
Ball et al., "Automatic Predicate Abstraction of C Programs," *Programming Language Design and Implementation (PLDI '01)*, Snowbird, Utah, 11 pp. (2001).
Ball et al., "The SLAM Project: Debugging System Software Via Static Analysis," *POPL 02: Principles of Programming Languages*, pp. 1-3 (2002).
Bryant, "Graph-based Algorithms for Boolean Function Manipulation," *IEEE Transactions on Computers*, pp. 1-25 (1986).
Chaki et al., "Modular Verification of Software Components in C," *Proc. of the 25th Intl. Conf. on Software Eng.*, 11 pp. (2003).
Clarke et al., "Predicate Abstraction of ANSI-C Programs Using SAT," *Formal Methods in System Design (FMSD)* 25, pp. 105-127, (Sep. 2004)
Cormen et al., *Introduction to Algorithms*, pp. 916-963, MIT Press (1990).
Somenzi, "CUDD:CU Decision Diagram Package, Release 2.4.1," 54 pp. (document dated May 17, 2005) [downloaded from the World Wide Web on Jun. 29, 2005].

(Continued)

*Primary Examiner*—Tuan Q Dam
*Assistant Examiner*—Hanh T Bui
(74) *Attorney, Agent, or Firm*—Klarquist Sparkman, LLP

(57) ABSTRACT

Predicate abstraction techniques and tools. Using symbolic decision procedures, predicate abstractions for computer programs are generated based on a set of predicates representing observations of expected behavior of the program. The set of predicates may be generated by an automatic program analysis tool or may be provided a user based on the user's observations. The predicate abstraction process may employ binary decision diagrams. Two or more symbolic decision procedures (e.g., for different kinds of program logic) can be combined to form a combined symbolic decision procedure to be used for predicate abstraction. A data structure can be used to track derived predicates during predicate abstraction.

12 Claims, 8 Drawing Sheets

OTHER PUBLICATIONS

Das et al., "Experience With Predicate Abstraction," *Computer-Aided Verification (CAV'99)*, LNCS 1633, pp. 160-171 (1999).

Flanagan et al., "Predicate Abstraction for Software Verification," *Proceedings of the 29th ACM SIGPLAN-SIGACT Symposium on Principles of Programming Languages (POPL'02)*, Portland, Oregon, pp. 191-202 (2002).

Graf et al., "Construction of Abstract State Graphs With PVS," *Proceedings of the 9th Conf. on Computer-Aided Verification (CAV '97)*, pp. 72-83 (1997).

Henzinger et al., "Lazy Abstraction," *Symposium on Principles of Programming Languages (POPL '02)*, Portland Oregon, 13 pp. (2002).

Lahiri et al., "A Symbolic Approach to Predicate Abstraction," *In Proc. of Computer-Aided Verification (CAV 2003)*, 13 pp. (2003).

McMillan, "Applying SAT Methods in Unbounded Symbolic Model Checking," *Computer-Aided Verification (CAV '02)*, LNCS 2404, pp. 240-264 (2002).

Microsoft Corporation, "SLAM Project," pp. 1-6 [downloaded from the World Wide Web on Jun. 29, 2005].

Namjoshi et al., "Syntactic Program Transformations for Automatic Abstraction," *Computer-Aided Verification*, LNCS 1855 (2000).

Nelson et al., "Simplification by Cooperating Decision Procedures," *ACM Transactions on Programming Languages and Systems (TOPLAS)*, vol. 1, No. 2, pp. 245-257 (1979).

Nelson et al., "Fast Decision Procedures Based in the Congruence Closure," *Journal of the ACM*, vol. 27, No. 2, pp. 356-364 (1980).

Saidi et al., "Abstract and Model Check While You Prove," *11th International Conference on Computer-Aided Verification, (CAV '99)*. Trento, Italy, pp. 1-12 (1999).

Seshia et al., "A User's Guide to UCLID Version 1.0," School of Computer Science, Dept. of Electrical & Computer Engineering, Carnegie Mellon University, Pittsburgh, PA, pp. 1-46 (2003).

Strichman et al., "Deciding Separation Formulas With SAT," *Proc. of the 14th International Conf. on Computer-Aided Verification*, pp. 209-222 (2002).

\* cited by examiner

Figure 5

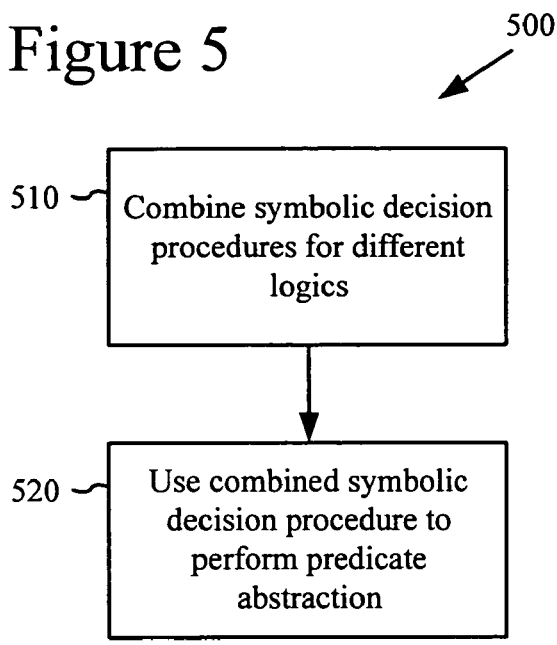

510 — Combine symbolic decision procedures for different logics

520 — Use combined symbolic decision procedure to perform predicate abstraction

Figure 6

| term | ::= | variable | function-symbol(term, ..., term) |
| formula | ::= | true | false | atomic-formula |
| | | | formula ∧ formula | formula ∨ formula | ¬ formula |
| atomic-formula | ::= | term = term | predicate-symbol(term, ..., term) |

Figure 7

$$\frac{X = Y}{Y = X} \qquad \frac{X = Y \quad Y \neq Z}{\bot}$$

$$\frac{X = Y \quad Y = Z}{X = Z} \qquad \frac{X_1 = Y_1 \quad \ldots \quad X_n = Y_n}{f(X_1, \ldots X_n) = f(Y_1, \ldots Y_n)}$$

Figure 10

1010 — Partition set of terms in *terms(G)* into equivalence classes using $G=$ predicates; $EC(t)$ denotes equivalence class for any term $t \in terms(G)$.
   (a) Initially, each term belongs to own distinct equivalence class.
   (b) Procedure $merge(t_1, t_2)$ takes two terms as inputs; merge equivalence classes of $t_1$ and $t_2$; if two terms $s_1 \doteq f(u_1, \ldots, u_n)$ and $s_2 \doteq f(v_1, \ldots, v_n)$ such that $EC(u_i) = EC(v_i)$, for every $1 \leq i \leq n$, then recursively call $merge(s1, s2)$.
   (c) For each $t_1 = t_2 \in G=$, call $merge(t_1, t_2)$.

1020 — If there exists predicate $t_1 \neq t2$ in $G\neq$, such that $EC(t_1) = EC(t_2)$, then return UNSATISFIABLE; else SATISFIABLE.

Figure 11

$$\frac{X \leq Z+C \quad Z \triangleright\triangleleft Y+D}{X \triangleright\triangleleft Y+(C+D)} \quad (A)$$

$$\frac{X < Z+C \quad Z \triangleright\triangleleft Y+D}{X < Y+(C+D)} \quad (B)$$

$$\frac{X < Y+C \quad Y \triangleright\triangleleft X+D \quad C+D \leq 0}{\bot} \quad (C)$$

$$\frac{X \leq Y+C \quad Y \leq X+D \quad C+D < 0}{\bot} \quad (D)$$

$$\frac{X \leq Y \quad Y \leq X}{X = Y} \quad (E)$$

| $n$ | $|P|$ | $SDP_T$ time (s) | UCLID time (s) |
|---|---|---|---|
| 3 | 14 | 0.20 | 19.37 |
| 4 | 19 | 0.43 | 656 |
| 5 | 24 | 0.65 | - |
| 10 | 49 | 5.81 | - |
| 12 | 59 | 12.28 | - |

Software 1380 with Described Predicate
Abstraction Techniques and Tools

PREDICATE ABSTRACTION VIA SYMBOLIC DECISION PROCEDURES

BACKGROUND

In the field of computer software testing, different approaches have been developed to more accurately and completely test program function. For example, program modeling and model checking allow certain kinds of debugging analysis that may not otherwise be possible or practical in direct analysis of a program. Program models simplify certain aspects of programs to facilitate more complete testing of their overall behavior. Program models can be used to analyze programs as a whole, or, for larger programs, to analyze them one part at a time. When errors are found, changes can then be made to the program source code to correct the errors.

One kind of program modeling is predicate abstraction. Predicate abstraction models the behavior of a program using Boolean predicates, which represent conditions in the program being modeled (the "source program") that can be evaluated as "true" or "false." For example, the Boolean predicate (x>0) evaluates to "true" if the variable x has a positive value in a given program state, and evaluates to "false" otherwise. Predicates can be drawn from conditional statements and assertions in a source program, or from other sources. Predicate abstraction can be done automatically using an automatic predicate abstraction tool, with programmer analysis, or with some combination of tools and programmer analysis.

The product of predicate abstraction is typically a finite-state program (also referred to as a Boolean program) that models behavior of the source program. The finite-state program is an abstraction of the source program to the extent that properties satisfied in the finite-state program are satisfied in the source program.

The predicate abstraction process is complex. Typically, tools called theorem provers are used to determine whether a particular formula (derived from a source program) is implied by some Boolean combination over a set of predicates P. However, in prior predicate abstraction methods, the number of calls to a theorem prover needed to make a determination for a particular formula would increase exponentially as the number of predicates in P increased, making such methods inefficient and expensive in terms of computing resources. Other methods have used heuristics to reduce the number of calls to theorem provers in an attempt to gain efficiency by sacrificing precision.

SUMMARY

In summary, predicate abstraction techniques and tools are described.

For example, using a symbolic decision procedure, a predicate abstraction for a computer program is generated based on a set of predicates representing observations of expected behavior of the computer program. The set of predicates may be generated by an automatic program analysis tool or may be provided a user based on the user's observations. The predicate abstraction process may employ binary decision diagrams.

Two or more symbolic decision procedures (e.g., for different kinds of program logic) can be combined to form a combined symbolic decision procedure for the source computer program, and combined symbolic decision procedure can be used to perform predicate abstraction for the computer program.

A data structure can be used to track derived predicates during predicate abstraction. For example, the data structure may comprise identifying information for predicates derived from an input set of predicates, and information indicating how the derived predicates were derived from the input set of predicates.

This Summary is provided to introduce a selection of concepts in a simplified form that are further described below in the Detailed Description and the accompanying drawings. This Summary is not intended to identify required features of the claimed subject matter or limit the scope of the claimed subject matter.

BRIEF DESCRIPTION OF THE DRAWINGS

FIG. 5 is a flow chart showing a technique for performing predicate abstraction via combined symbolic decision procedures in some implementations.

FIG. 6 is a table showing a syntax for first order logic used in predicate abstraction in one implementation.

FIG. 7 is a table showing inference rules for the theory of equality and uninterpreted functions used in one implementation.

FIG. 10 is a flow chart showing a congruence closure algorithm.

FIG. 11 is a table showing inference rules for a theory of difference logic used in one implementation.

DETAILED DESCRIPTION

Figure 1:
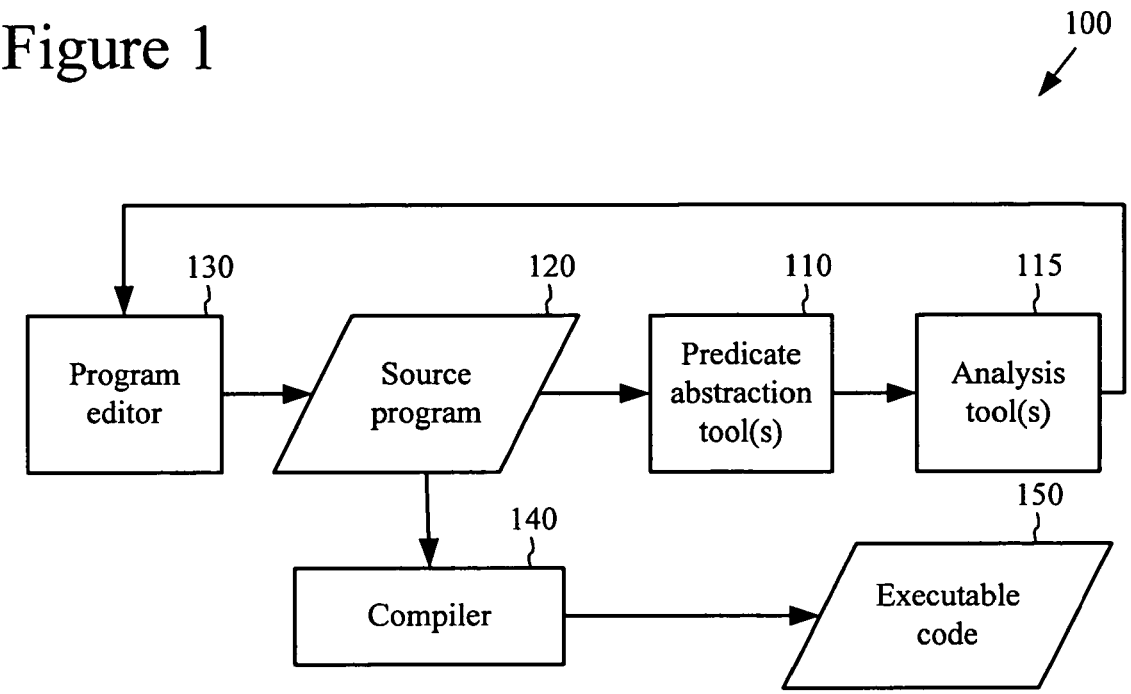
FIG. 1 is a block diagram of a predicate abstraction system used in some implementations.

Described techniques and tools are directed to predicate abstraction for modeling and testing of computer software. For example, techniques and tools for performing predicate abstraction using symbolic decision procedures are described.

Various alternatives to the implementations described herein are possible. For example, techniques described with reference to flowchart diagrams can be altered by changing the ordering of stages shown in the flowcharts, by repeating or omitting certain stages, etc. As another example, described predicate abstraction tools can be modified relative to the examples described with reference to system diagrams by combining, adding, rearranging, or modifying system components. As another example, the implementations can be applied to other kinds of source code (e.g., other languages, data types, functions, interfaces, etc.), programming styles, and software designs (e.g., software designed for distributed computing, concurrent programs, etc.).

The various techniques and tools can be used in combination or independently. Different embodiments implement one or more of the described techniques and tools. Some techniques and tools described herein can be used in a predicate abstraction system, or in some other system not specifically limited to predicate abstraction.

I. Predicate Abstraction Techniques and Tools

Predicate abstraction is a technique for automatically creating finite abstract models of finite and infinite state systems. Predicate abstraction is based on observations over the state space of the program. These observations can be taken directly from the code (as they appear in conditionals) or provided by programmers or testers, or automatic analysis tools. Predicate abstraction makes it possible to increase the level of testing thoroughness through the addition of new observations.

Many errors that go undetected in conventional program testing are due to complex correlations between program predicates (which control the execution of statements) and program statements (which in turn affect the values of the predicates). A predicate is an expression that maps a program state to a Boolean value. For example, the predicate (x>0) indicates whether or not variable x has a positive value in a given state. Predicates can be drawn from the conditional statements and assertions in a program, as well as from implicit run-time "safety" checks (e.g., checking for array bound violations and division by zero) from automated analysis, from a programmer, or from some combination of human and automatic analysis. Predicates can be used, for example, to generate a Boolean program abstracted from a source program (e.g., a source program written in C/C++ or some other programming language).

In prior predicate abstraction methods, tools called theorem provers were used to determine whether a particular formula (derived from a source program) is implied by some boolean combination over a set of predicates P. However, in such prior methods, the number of calls to a theorem prover that were needed to make a determination for a particular formula would increase exponentially as the number of predicates in P increased, making such methods inefficient and expensive in terms of computing resources. Other methods have used heuristics to reduce the number of calls to theorem provers in an attempt to gain efficiency by sacrificing precision.

Described techniques and tools improve efficiency of predicate abstraction through the use of symbolic decision procedures. The use of symbolic decision procedures avoids the complexity of making an exponential number of theorem prover calls that characterizes earlier predicate abstraction methods without sacrificing precision. Described techniques and tools gain efficiency by exploiting properties of specific logics and tailoring the analysis of the formula to the needs of predicate abstraction. Described techniques and tools are distinct from other theorem-prover methods which suffer from exponential complexity and do not take into account the structure of the input formula in determining whether the formula was true or false when applied to the source program.

FIG. 1 is a system diagram of an example of a predicate abstraction system 100 used in some implementations. In the system 100, results of application of predicate abstraction tools (e.g., tools that perform predicate abstraction with symbolic decision procedures) 110 to a source program 120 can be used to guide subsequent modifications of the source program. For example, a programmer can analyze (or use an analysis tool 115 to analyze) a finite-state program and then use information obtained from the finite-state program (e.g., information indicating the presence of bugs or design flaws in the program) to edit the source program 120 using a program editor 130. The source program 120 (including any changes made as a result of analyzing predicate abstraction results) can then be compiled in a compiler 140 to produce executable code 150. The compiler 140 may include bug-detection or other program analysis capabilities, and a programmer may wish to further edit the source program 120 based on information provided by the compiler before actually compiling the source program into executable code 150.

A. Decision Procedure Overview

A decision procedure is an algorithm that, given a formula of interest, or goal, g, can determine whether g is consistent (or inconsistent) with a given set of predicates P and a given set of inference rules R. Theorem provers used in predicate abstraction techniques are decision procedures, in that they can be used to decide whether a given formula holds or does not hold in a source program. For example, consider a decision procedure that returns the Boolean value "true" if goal g is consistent with P and R, and returns the Boolean value "false" otherwise. Assume that the goal g given as input to the decision procedure is a=c. If the set of predicates P consists of the predicates a=b and b=c, and one of the rules in R is the rule of transitivity (i.e., if x=y and y=z, then x=z), then the goal (a=c) is consistent with P and R, and the decision procedure returns "true."

Figure 2:
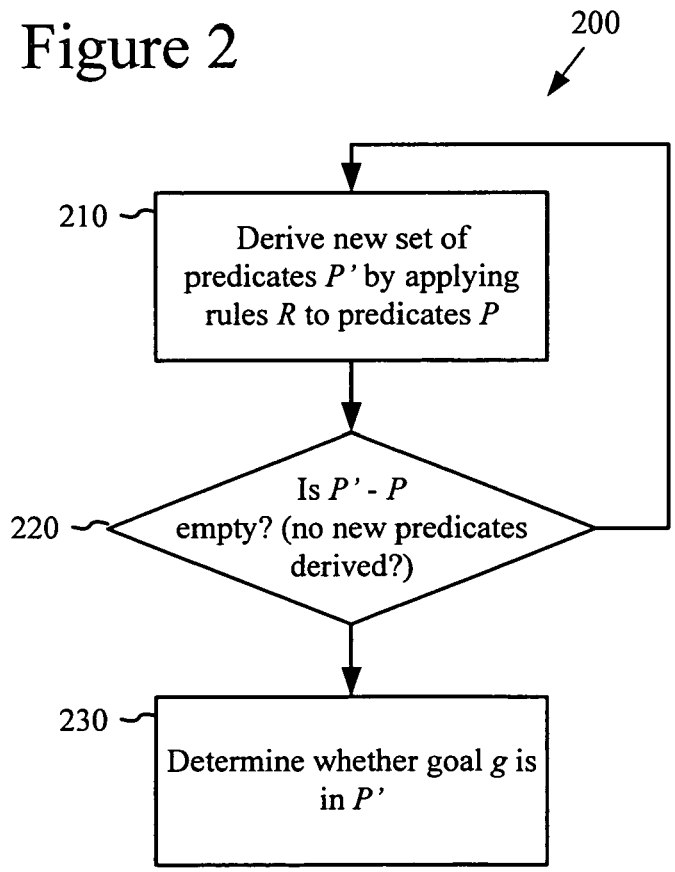
FIG. 2 is a flow chart showing a saturation decision procedure.

A saturation decision procedure is a decision procedure with a set of inference rules R that takes as input a set of predicates P and outputs the set of predicates P' that can be derived from application of the rules R to P. FIG. 2 is a flow chart showing a saturation decision procedure 200. At 210, a set of predicates P' is derived by applying rules R to an original set of predicates P. At 220, if the set of predicates P' includes newly derived predicates that were not in the original set of predicates P, then P' is used as input and new predicates are derived again, if possible, by applying P' to R. If, on the other hand, no new predicates were derived, the full set of predicates derivable from P and R has been achieved, and at 230 the saturation decision procedure 200 determines whether a goal g is present in the derived set of predicates.

For example, assume that the goal g given as input to the decision procedure is a=d. If the set of predicates P consists of the predicates a=b and b=c, and R consists of the rule of transitivity, then the predicate a=c can be derived from P and is included in the set P'. However, after inputting P' (where P'={a=b, b=c, a=c}), no new predicates are derived. The saturation decision procedure then determines that the goal (a=d) is not in P'.

B. Predicate Abstraction via Symbolic Decision Procedures

In described techniques and tools, predicate abstraction is performed using symbolic decision procedures. Symbolic decision procedures use symbolic expressions to describe ranges or combinations of inputs. Because symbolic expressions can represent many different possible inputs in a single expression, symbolic decision procedures are able to analyze many possible inputs without requiring a call to a theorem prover for each input.

For example, a symbolic decision procedure can determine several ways in which g can be derived from (and is consistent with) predicates in P. For example, given a set of predicates P={a=b, b=c, a=d, d=c} and the goal a=c, a symbolic decision procedure can extract the possible ways in which a=c can be derived from the predicates in P (namely, from the predicates a=b and b=c, or from the predicates a=d and d=c).

Or, a symbolic decision procedure can determine subsets of predicates in P (if any) with which g is inconsistent. Given an input set of predicates P and a goal g, a symbolic decision procedure outputs one or more subsets P' of predicates such that each subset P' is inconsistent with g. For example, assuming a set of rules R that includes the transitivity rule in the symbolic decision procedure, if a subset P'={a=b, b=c}, and g is a≠c, then g is inconsistent with P'. The symbolic decision procedure returns the subset P'. The symbolic decision procedure also can return other subsets of P that are inconsistent with g. In other words, the output of the symbolic decision procedure represents the set of subsets of P that are inconsistent with g.

A reduction in computational complexity is made possible by the nature of symbolic decision procedures and a data structure maintained during predicate abstraction.

Figure 3:
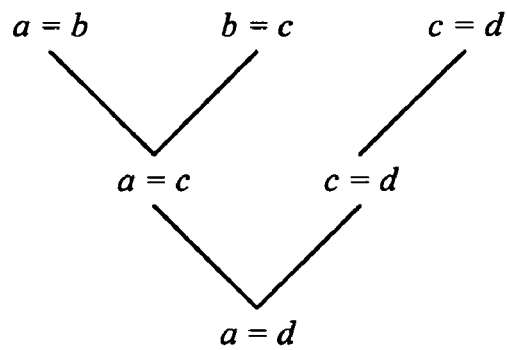
FIG. 3 is a graph depicting a data structure used for tracking derived predicates in some implementations.

FIG. 3 is a graph depicting an example of a data structure 300 for tracking derived predicates in some implementations. In the example shown in FIG. 3, from an original set of predicates P={a=b, b=c, c=d }, a symbolic decision procedure first derives a new predicate (a=c) based on the rule of transitivity from the predicates a=b and b=c. The symbolic decision procedure then derives another predicate (a=d ) from the derived predicate a=c and the original predicate c=d. This data structure is referred to as a derivation tree and can be used to represent subsets of interest to the symbolic decision procedure (e.g., subsets of predicates with which a goal g is inconsistent, etc.). Other such data structures will include different numbers and types of original and derived predicates than those shown in FIG. 3.

Figure 4:
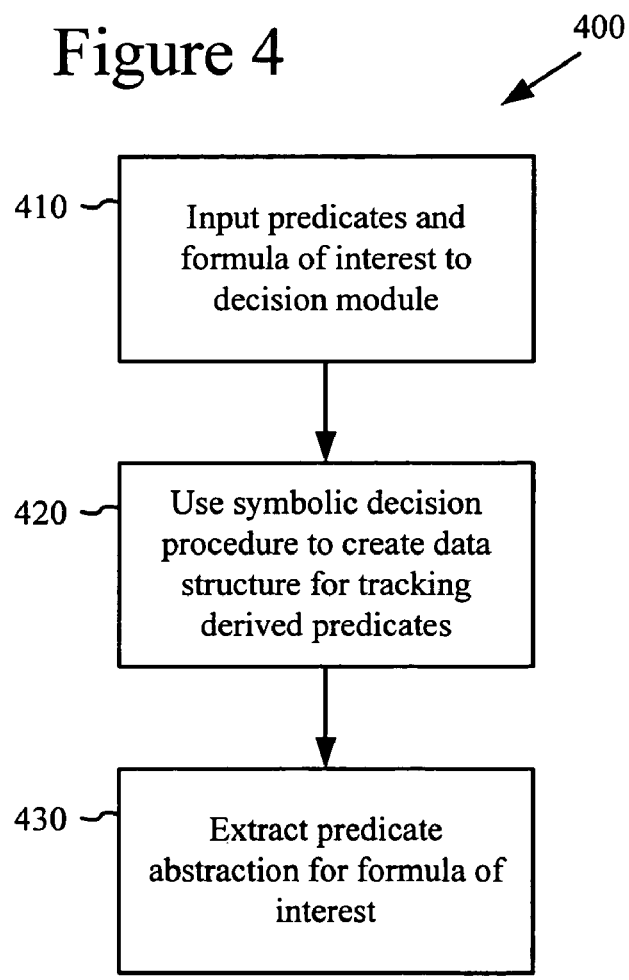
FIG. 4 is a flow chart showing a technique for performing predicate abstraction via symbolic decision procedures in some implementations.

FIGS. 4 and 5 show exemplary predicate abstraction techniques used in some implementations.

For example, FIG. 4 is a flow chart showing a technique 400 for performing predicate abstraction via symbolic decision procedures. At 410, a decision module comprising a symbolic decision procedure takes as input a set of predicates and a formula of interest. At 420, the symbolic decision procedure is used to create a data structure for tracking derived predicates. Then, at 430, a predicate abstraction for the formula of interest is extracted.

Combined symbolic decision procedures can be used to perform predicate abstraction on source programs having different logic theories. For example, a source program may have logic that deals with mathematic properties of integers (e.g., integer x is greater than, less than, or equal to integer y, etc.) and logic that deals with arrays (e.g., array element A[i] is equal to array element A[j] because the integer at index i and the integer at index j are equal to each other). In such cases, symbolic decision procedures having rules specific to each kind of logic can be combined, and the combined symbolic decision procedure can be used for predicate abstraction.

For example, FIG. 5 is a flow chart showing a technique 500 for performing predicate abstraction via combined symbolic decision procedures. At 510, symbolic decision procedures for different logics are combined. Then, at 520, the combined symbolic decision procedure is used to perform predicate abstraction. More details on combined symbolic decision procedures are provided below in Section II.

II. Detailed Examples

This section provides a detailed explanation of principles underlying described predicate abstraction techniques and tools, with reference to specific examples. Various implementations of the described techniques and tools are possible based on principles described in this section. In practice, implementations of the described techniques and tools can differ in some respects from the specific examples described in this section. For example, different inference rules can be used, and the techniques described can be applied to perform predicate abstraction on different kinds of source program logic (e.g., array theories, string theories, pointer theories, etc.).

A fundamental operation in predicate abstraction can be summarized as follows. Given a set of predicates P describing some set of properties of the system state, and a formula e, compute the weakest Boolean formula $F_P(e)$ over the predicates P that implies e. (The dual of this problem, which is to compute the strongest Boolean formula $G_P(e)$ that is implied by e, can be expressed as $\neg F_P(\neg e)$.)

In the detailed examples provided in this section, a symbolic decision procedure ("SDP") for a theory T ($SDP_T$) takes sets of predicates G and E and symbolically executes a decision procedure for T on G' $\cup$ { $\neg e | e \in E$ }, for all the subsets G' of G. The result of $SDP_T$ is a shared expression (represented by a directed acyclic graph) that implicitly represents the answer to a predicate abstraction query. The shared expression (an expression where common sub-expressions can be shared) represents those subsets G' $\subseteq$ G, for which G' $\cup$ { $\neg e | e \in E$ } is unsatisfiable. We show that such a procedure can be used to compute $F_P$ (e) for performing predicate abstraction.

The detailed examples provided in this section present symbolic decision procedures for the logic of Equality and Uninterpreted Functions (EUF) and Difference logic (DIF) and show that these procedures run in polynomial and pseudo-polynomial time, respectively (rather than exponential time), and therefore produce compact shared expressions. A method to construct SDPs for simple mixed theories (including EUF+DIF) is provided that uses an extension of the Nelson-Oppen combination method. Binary decision diagrams (BDDs) are used to construct $F_P(e)$ from the shared representations efficiently in practice. An evaluation on predicate abstraction benchmarks from device driver verification in the SLAM toolkit is provided, and shows improvement over other predicate abstraction methods.

FIG. 6 defines a syntax of a quantifier-free fragment of first-order logic. An expression in the logic can either be a "term" or a "formula." A "term" (as used in this context) can either be a variable or an application of a function symbol to a list of terms. A "formula" (as used in this context) can be the constants "true" or "false" or an atomic formula or Boolean combination of other formulas. Atomic formulas can be formed by an equality between terms or by an application of a predicate symbol to a list of terms.

The function and predicate symbols can either be "uninterpreted" or can be defined by a particular theory. For instance, the theory of integer linear arithmetic defines the function-symbol "+" to be the addition function over integers and "<" to be the comparison predicate over integers. If an expression involves function or predicate symbols from multiple theories, then it is said to be an expression over "mixed" theories. A formula F is said to be "satisfiable" if it is possible to assign values to the various symbols in the formula from the domains associated with the theories to make the formula true. A formula is "valid" if $\neg F$ is not satisfiable. We say a formula A "implies" a formula B (A$\Rightarrow$B) if and only if ($\neg$A) $\vee$B is valid.

A "shared expression" is a directed acyclic graph (DAG) representation of an expression where common subexpressions can be shared, by using names to refer to common subexpressions. For example, the intermediate variable t refers to the expression $e_1$ in the shared expression "let t=$e_1$ in $(e_2 \wedge t) \vee (e_3 \wedge \neg t)$".

A predicate is an atomic formula or its negation. (The phrase "predicate symbol" (rather than the word "predicate" alone) is used to refer to symbols like "<".) If G is a set of predicates, then we define $\tilde{G} = \{\neg g | g \in G\}$, to be the set containing the negations of the predicates in G. The word "predicate" in this context is used in a general sense to refer to any atomic formula or its negation and should not be confused to mean only the set of predicates that are used in predicate abstraction.

Definition 1. For a set of predicates P, a literal $l_i$ over P is either a predicate $p_i$ or $\neg p_i$, where $p_i \in P$. A cube c over P is a conjunction of literals. A clause cl over P is a disjunction of literals. Finally, a minterm over P is a cube with |P| literals, and exactly one of $p_i$ or $\neg p_i$ is present in the cube.

Given a set of predicates $P = \{p_1, \ldots, p_n\}$ and a formula e, the main operation in predicate abstraction involves constructing the weakest Boolean formula $F_P(e)$ over P such that $F_P(e) \Rightarrow e$. The expression $F_P(e)$ can be expressed as the set of all the minterms over P that imply e:

$$F_P(e) = \vee \{c | c \text{ is a minterm over } P \text{ and } c \text{ implies } e\} \quad (1)$$

Proposition 1. For a set of predicates P and a formula e, (i) $F_P(\neg e) \Rightarrow \neg F_P(e)$, (ii) $F_P(e_1 \wedge e_2)$, $F_P(e_1) \wedge F_P(e_2)$, and (iii) $F_P(e_1) \vee F_P(e_2) \Rightarrow F_P(e_1 \vee e_2)$.

These properties follow very easily from the definition of $F_P$. We know that $F_P(e) \Rightarrow e$, by the definition of $F_P(e)$. By contrapositive rule, $\neg e \Rightarrow \neg F_P(e)$. But $F_P(\neg e) \Rightarrow \neg e$. Therefore, $F_P(\neg e) \Rightarrow \neg F_P(e)$. To prove the second equation, we prove that (i) $F_P(e_1 \wedge e_2) \Rightarrow (F_P(e_1) \wedge F_P(e_2))$, and (ii) $(F_P(e_1) \wedge F_P(e_2)) \Rightarrow F_P(e_1 \wedge e_2)$. Since $e_1 \hat{} e_2$) $e_i$ (for $i \in \{1, 2\}$), $F_P(e_1 \wedge e_2)$) $F_P(e_i)$. Therefore $F_P(e_1 \wedge e_2) \Rightarrow (F_P(e_1) \wedge F_P(e_2))$. On the other hand, $F_P(e_1) \Rightarrow e_1$ and $F_P(e_2) \Rightarrow e_2$, $F_P(e_1) \wedge F_P(e_2) \Rightarrow e_1 \wedge e_2$. Since $F_P(e_1 \wedge e_2)$ is the weakest expression that implies $e_1 \wedge e_2$, $F_P(e_1) \wedge F_P(e_2) \Rightarrow F_P(e_1 \wedge e_2)$. To prove the third equation, note that $F_P(e_1) \vee F_P(e_2) \Rightarrow e_1 \vee e_2$ and $F_P(e_1 \vee e_2)$ is the weakest expression that implies $e_1 \vee e_2$.

The operation $F_P(e)$ does not distribute over disjunctions. Consider the example where $P = \{x \neq 5\}$ and $e = x < 5 \vee x > 5$. In this case, $F_P(e) = x \neq 5$. However $F_P(x < 5) = $ "false" and $F_P(x > 5) = $ "false" and thus $(F_P(x < 5) \vee F_P(x > 5))$ is not the same as $F_P(e)$.

The above properties suggest that one can adopt a two-tier approach to compute $F_P(e)$ for any formula e:

1. Convert e into an equivalent Conjunctive Normal Form (CNF), which comprises a conjunction of clauses, i.e., $e = (\wedge cl_i)$.

2. For each clause $cl_i = (e_1^i \vee e_2^i \ldots \vee e_m^i)$, compute $r_i = F_P(cl_i)$ and return $F_P(e) = (\wedge r_i)$.

We focus here on computing $F_P(\vee_{e_i \in E} e_i)$ when $e_i$ is a predicate. Unless specified otherwise, we use e to denote $(\vee_{e_i \in E} e_i)$, a disjunction of predicates in the set E in the sequel. For converting a formula to an equivalent CNF efficiently, we can use satisfiability (SAT) algorithms.

A. Predicate Abstraction Using Symbolic Decision Procedures (SDPs)

A set of predicates G (over theory T) is unsatisfiable if the formula $(\wedge_{g \in G} g)$ is unsatisfiable. For a given theory T, the decision procedure for T takes a set of predicates G in the theory and checks if G is unsatisfiable. A theory is defined by a set of inference rules. An inference rule R is of the form:

$$\frac{A_1 \quad A_2 \quad \cdots \quad A_n}{A}$$

which denotes that the predicate A can be derived from predicates $A_1, \ldots, A_n$ in one step. Each theory has least one inference rule for deriving contradiction ($\bot$). We also use $g :- g_1, \ldots, g_k$ to denote that the predicate g (or $\bot$, where $g = \bot$) can be derived from the predicates $g_1, \ldots, g_k$ using one of the inference rules in a single step. FIG. 7 describes the inference rules for the theory of Equality and Uninterpreted Functions.

1. Saturation-Based Decision Procedures

A saturation-based decision procedure for a theory T can be used to describe the meaning of a symbolic decision procedure for the theory T.

Figure 8:
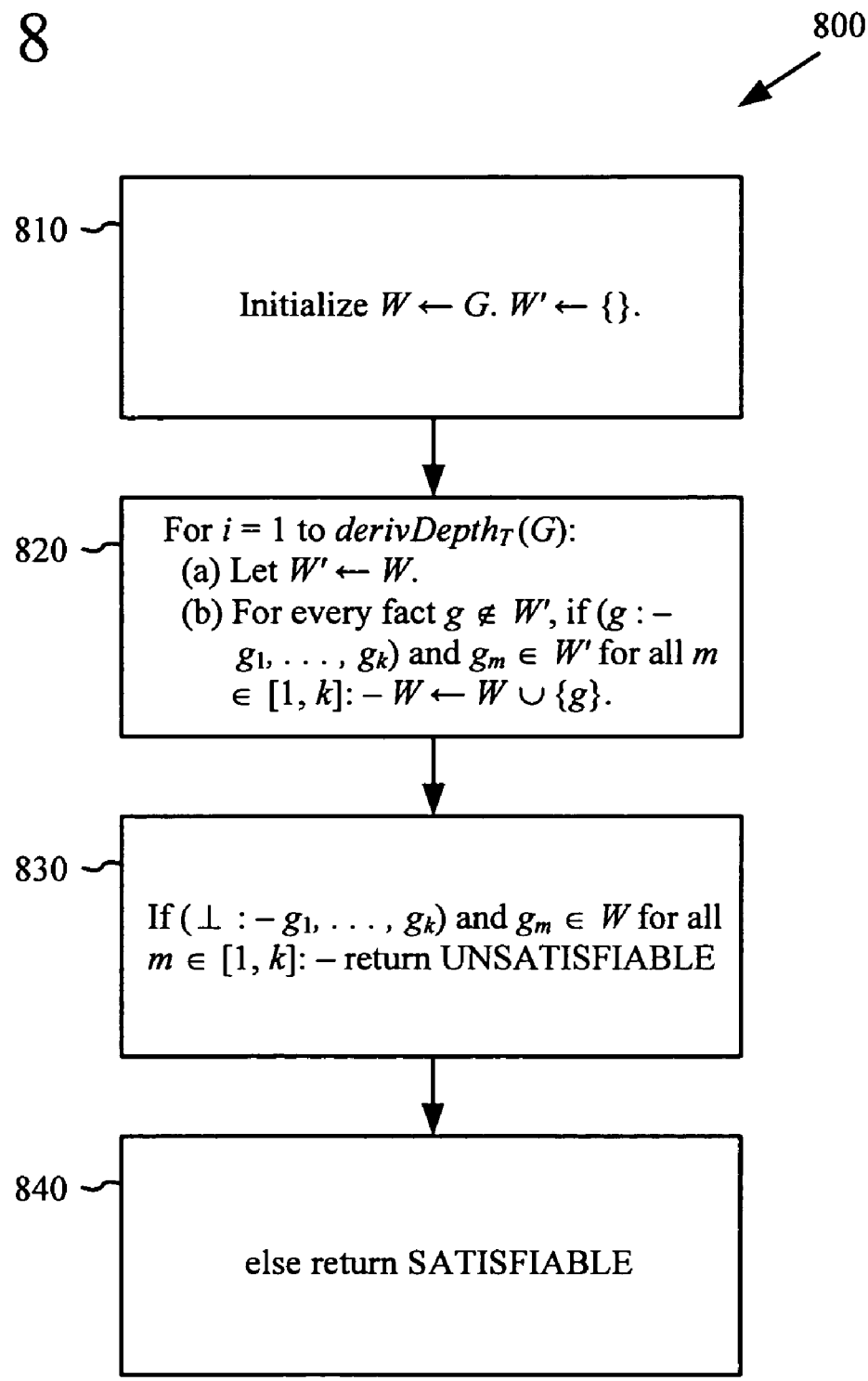
FIG. 8 is a flow chart showing a saturation-based decision procedure for a theory T.

Consider a simple saturation-based procedure $DP_T$ (800) shown in FIG. 8 that takes a set of predicates G as input and returns SATISFIABLE or UNSATISFIABLE. The algorithm maintains two sets: W is the set of predicates derived from G up to (and including) the current iteration of the loop at 820; W' is the set of all predicates derived before the current iteration. These sets are initialized at 810. During each iteration at 820, if a new predicate g can be derived from a set of predicates $\{g_1, \ldots, g_k\} \subseteq W'$, then g is added to W. The loop terminates after a bound derivDepthT (G). At 830, we check if any subset of facts in W can derive contradiction. If such a subset exists, the algorithm returns UNSATISFIABLE, otherwise it returns SATISFIABLE at 840.

The parameter $d = \text{derivDepth}_T(G)$ is a bound (that is determined solely by the set G for the theory T) such that if the loop at 820 is repeated for at least d steps, then $DP_T(G)$ returns UNSATISFIABLE if and only if G is unsatisfiable. If such a bound exists for any set of predicates G in the theory, then $DP_T$ procedure implements a decision procedure for T.

Definition 2. A theory T is called a saturation theory if the procedure $DP_T$ described in FIG. 8 implements a decision procedure for T.

To show that a theory T is a saturation theory, it suffices to consider a decision procedure algorithm for T (e.g., $A_T$) and show that $DP_T$ implements $A_T$. This can be shown by deriving a bound on $\text{derivDepth}_T(G)$ for any set G in the theory.

2. Symbolic Decision Procedures

A symbolic decision procedure can yield a shared expression of $F_P(e)$ for predicate abstraction.

For a (saturation) theory T, a symbolic decision procedure for T ($SDP_T$) takes sets of predicates G and E as inputs, and symbolically simulates $DP_T$ on $G' \cup \tilde{E}$, for every subset $G' \subseteq G$. The output of $SDP_T(G, E)$ is a symbolic expression representing those subsets $G' \subseteq G$, such that $G' \cup \tilde{E}$ is unsatisfiable. Thus with $|G| = n$, a single run of $SDP_T$ symbolically executes $2^n$ runs of $DP_T$.

We introduce a set of Boolean variables $B_G = \{b_g | g \in G\}$, one for each predicate in G. An assignment $\sigma: B_G \rightarrow \{\text{true, false}\}$ over $B_G$ uniquely represents a subset $G' = \{g | \sigma(b_g) = \text{true}\}$ of G.

Figure 9:
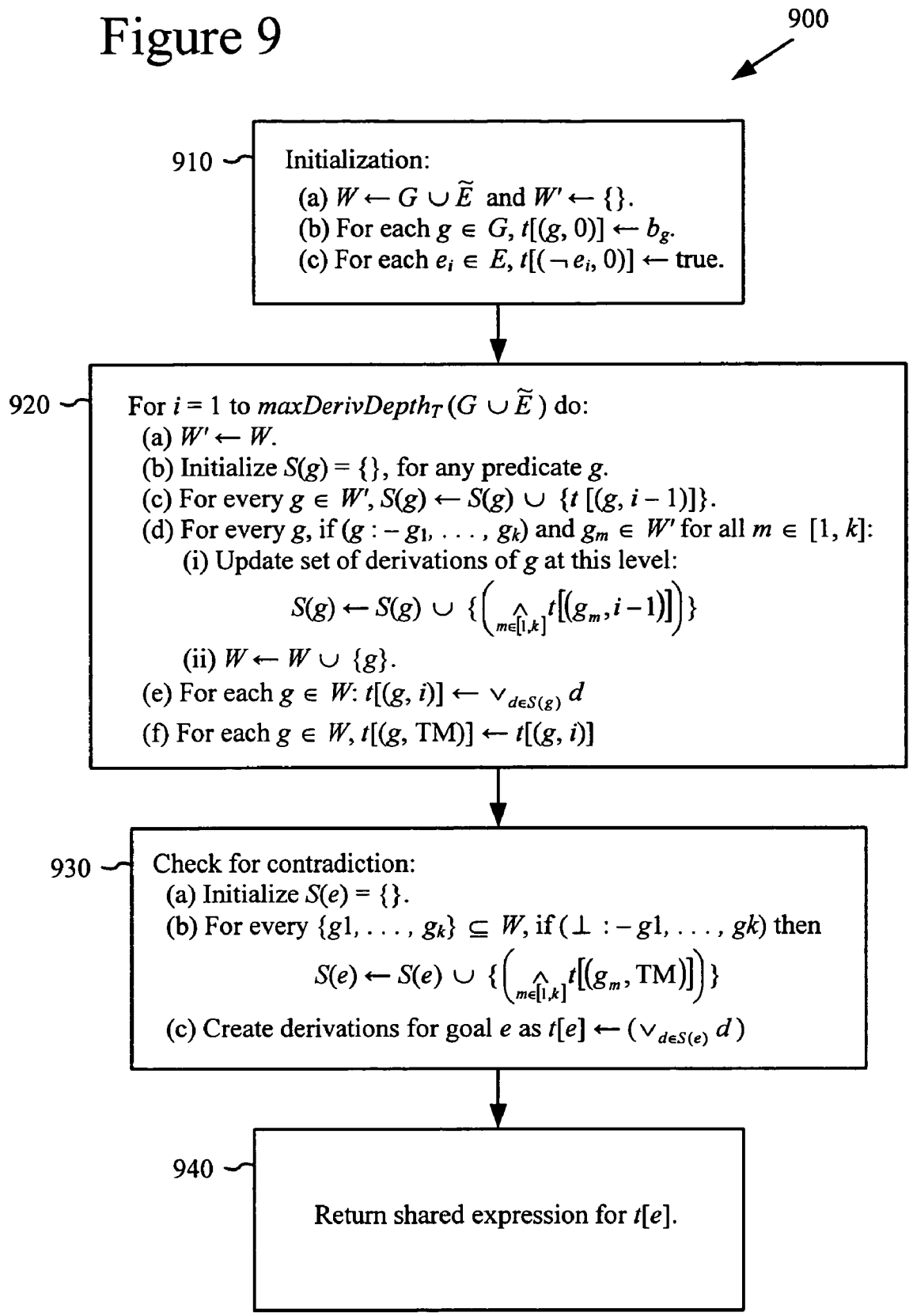
FIG. 9 is a flow chart showing a symbolic decision procedure for a theory T in one implementation.

FIG. 9 presents the symbolic decision procedure (900) for a theory T, which symbolically executes the saturation based decision procedure $DP_T$ on all possible subsets of the input component G. Just like the $DP_T$ algorithm, this procedure also has three main components: initialization, saturation and contradiction detection. The algorithm also maintains sets W and W', as the $DP_T$ algorithm does.

Since SDP(G, E) has to execute $DP_T(G' \cup \tilde{E})$ on all $G' \subseteq G$, the number of steps to iterate the saturation loop equals the maximum $\text{derivDepth}_T(G' \cup \tilde{E})$ for any $G' \subseteq G$. For a set of predicates S, we define the bound $\text{maxDerivDepth}_T(S)$ as follows:

$$\text{maxDerivDepth}_T(S) = \max\{\text{derivDepth}_T(S') | S' \subseteq S_g\}$$

Terminating the loop at 920 of symbolic decision procedure $SDP_T(G, E)$ in FIG. 9 once the set of predicates in W does not change across two iterations would lead to an incomplete procedure.

The following example shows that the saturation of the set of derived predicates in the $SDP_T$ algorithm is not a sufficient condition for termination. Consider an example where G contains a set of predicates that denotes an "almost" fully connected graph over vertices $x_1, \ldots, x_n$. G contains an equality predicate between every pair of variables except the edge between $x_1$ and $x_n$. Let $E \doteq \{x_1 = x_n\}$. After one iteration of the $SDP_T$ algorithm on this example, W will contain an equality between every pair of variables including $x_1$ and $x_n$ since $x_1 = x_n$ can be derived from $x_1 = x_i, x_i = x_n$, for every $1 < i < n$. Therefore, if the $SDP_T$ algorithm terminates once the set of predicates in W terminates, the procedure will terminate after two steps. Now, consider the subset $G' = \{x_1 = x_2, x_2 = x_3, \ldots, x_i = x_{i+1}, \ldots, x_{n-1} = x_n\}$ of G. For this subset of G, $DP_T(G' \cup \tilde{E})$ requires $\lg(n) > 1$ (for $n > 2$) steps to derive the fact $x_1 = x_n$. Therefore $SDP_T(G, E)$ does not simulate the action of $DP_T(G' \cup \tilde{E})$. More formally, eval(t[e], G')=false, but $G' \cup \tilde{E}$ is unsatisfiable.

During the execution, the algorithm constructs a set of shared expressions with the variables over $B_G$ as the leaves and temporary variables $t[\bullet]$ to name intermediate expressions. We use $t[(g, i)]$ to denote the expression for the predicate g after the iteration i of the loop at 920. We use $t[(g, TM)]$ to denote the top-most expression for g in the shared expression. Below, we briefly describe phases of $SDP_T$:

Initialization (process block 910 in FIG. 9). The set W is initialized to $G \cup \tilde{E}$ and W' to { }. The leaves of the shared expression symbolically encode each subset $G' \cup \tilde{E}$, for every $G' \subseteq G$. For each $g \in G$, the leaf $t[(g, 0)]$ is set to $b_g$. For any $e_i \in E$, since $\neg e_i$ is present in all possible subsets $G' \cup \tilde{E}$, we replace the leaf for $\neg e_i$ with true.

Saturation (process block 920). For each predicate g, S(g) is the set of derivations of g from predicates in W' during any iteration. For any predicate g, we first add all the ways to derive g until the previous steps by adding $t[(g, i-1)]$ to S(g). Every time g can be derived from some set of facts $g_1, \ldots, g_k$ such that each $g_j$ is in W', we add this derivation to S(g) at sub-step (d)(i) at 920. At the end of the iteration i, $t[(g, i)]$ and $t[(g, TM)]$ are updated with the set of derivations in S(g). The loop is executed max-$DerivDepth_T(G \cup \tilde{E})$ times.

Contradiction (process blocks 930, 940). We know that if $G' \cup \tilde{E}$ is unsatisfiable, then G' implies e (recall, e stands for $\wedge e_i \in E \, e_i$). Therefore, each derivation of $\bot$ from predicates in W gives a new derivation of e. The set S(e) collects these derivations and constructs the final expression t[e], which is returned at 940.

The output of the procedure is the shared expression t[e]. The leaves of the expression are the variables in $B_G$. The only operations in t[e] are conjunction and disjunction; t[e] is thus a Boolean expression over $B_G$.

We now define the evaluation of a (shared) expression with respect to a subset $G' \subseteq G$.

Definition 3. For any expression t[x] whose leaves are in set $B_G$, and a set $G' \subseteq G$, we define eval(t[x], G') as the evaluation of t[x], after replacing each leaf $b_g$ of t[x] with true if $g \in G'$ and with false otherwise.

The following theorem explains the correctness of the symbolic decision procedure.

Theorem 1. If $t[e] \doteq SDP_T(G, E)$, then for any set of predicates $G' \subseteq G$, eval(t[e], G')=true if and only if $DP_T(G' \cup \tilde{E})$ returns UNSATISFIABLE.

Corollary 1. For a set of predicates P, if $t[e] \doteq SDP_T(P \cup \tilde{P}, E)$, then for any $P' \subseteq (P \cup \tilde{P})$ representing a minterm over P (i.e., $p_i \in P'$ iff $\neg p_i \notin P'$), eval(t[e], P')=eval($F_P(e)$, P').

A proof of Theorem 1 follows.

To prove Theorem 1, we first describe an intermediate lemma about $SDP_T$. To disambiguate between the data structures used in DPT and $SDP_T$, we use $W_S$ and $W'_S$ (corresponding to symbolic) to denote W and W' respectively for the SDP algorithm. Moreover, it is also clear that W' (respectively $W'_S$) at the iteration i is the same as W (respectively $W_S$) after i−1 iterations.

Lemma 1. For any set of predicates $G' \subseteq G$, at the end of i ($i \geq 0$) iterations of the loop in the saturation step of $SDP_T(G, E)$ and DPT ($G' \cup \tilde{E}$) procedures:
1. $W \subseteq W_S$, and
2. eval(t[(g, i)], G')=true if and only if $g \in W$ for the DPT algorithm.

Proof. We use an induction on i to prove this lemma, starting from i=0. For the base case (after the initialization steps of both algorithms), $W = G' \cup \tilde{E} \subseteq G \cup \tilde{E} \subseteq W_S$. Moreover, for this step, eval(t[(g, 0)], G') for a predicate g can be true in two ways.
1. If $g \in \tilde{E}$, then the initialization step of $SDP_T$ assigns it to true. Therefore eval(t[(g, 0)], G') is true for any G'. But in the initialization step of DPT($G' \cup \tilde{E}$), W contains all the predicates in $G' \cup \tilde{E}$, and therefore $g \in W$.
2. If $g \in G'$, then eval(t[(g, 0)], G')=eval($b_g$, G') which is true, by the definition of eval(,). Again, $g \in W$ after the initialization step of the DPT algorithm, too.

Let us assume that the inductive hypothesis holds for all values of i less than m. Consider the iteration number m. It is easy to see that if any fact g is added to W in this step, then g is also added to $W_S$; therefore part (1) of the lemma is easily established.

To prove part (2) of the lemma, we will consider two cases depending on whether a predicate g was present in W before the mth iteration:
1. Let us assume that after m−1 iterations of DPT($G' \cup \tilde{E}$) procedure, $g \in W$. Since g is never removed from W during any step of DPT, $g \in W$ after m iterations, too. Now, by the inductive hypothesis, eval(t[(g, m−1)], G')=true. However, t[(g, m−1)]$\Rightarrow$t[(g, m)] (because t[(g, m)] contains t[(g, m−1)] as one of its disjuncts in step (c) of process block 920 of the $SDP_T$ algorithm). Therefore, eval(t[(g, m)], G')=true.
2. We have to consider two cases depending on whether g can be derived in DPT($G' \cup \tilde{E}$) in step m.
   (a) If g can't be derived in this step in DPT algorithm, then there is no set $\{g_1, \ldots, g_k\} \subseteq W'$ (of DPT) such that g:-$g_1, \ldots, g_k$. Since W' is the same as W after m−1 iterations, we can invoke the induction hypothesis to show that for every predicate $g_j \in \{g_1, \ldots, g_k\}$, eval(t[($g_j$, m−1)], G')=false. Moreover, eval(t[(g, m−1)], G')=false, since $g \notin W$ after m−1 steps. Thus eval(t[(g, m)], G')=false.
   (b) If g can be derived from $\{g_1, \ldots, g_k\} \subseteq W'$ (of DPT), then $\wedge_j$ t[($g_j$, m−1)] implies t[(g, m)]. But for each $g_j \in \{g_1, \ldots, g_k\}$, eval(($g_j$, m−1), G')=true, and thus eval((g, m), G')=true.

This completes the induction proof, and we are now ready to complete the proof of Theorem 1.

Consider the situation where both $SDP_T(G, E)$ and DPT $(G' \cup \tilde{E})$ have executed the loop in process block 920 for $i=\text{maxDerivDepthT }(G \cup \tilde{E})$. We will consider two cases depending on whether $\bot$ can be derived in $DPT(G' \cup \tilde{E})$ in step process block 930.

Suppose after i iterations, there is a set $\{g_1, \ldots, g_k\} \subseteq W$, such that $\bot :-g_1, \ldots, g_k$. This implies that $G' \cup \tilde{E}$ is unsatisfiable. By Lemma 1, we know that $\text{eval}(t[(g_j, TM)], G')=\text{true}$ for each $g_j \in \{g_1, \ldots, g_k\}$, and therefore $\text{eval}(t[e], G')=\text{true}$.

On the other hand, let $\text{eval}(t[e], G')=\text{true}$. This implies that there exists a set $\{g_1, \ldots, g_k\} \subseteq W_S$, such that $\bot :-g_1, \ldots, g_k$ and $\text{eval}(t[(g_j, TM)], G')=\text{true}$ for each $g_j \in \{g_1, \ldots, g_k\}$. By Lemma 1, we know that $\{g_1, \ldots, g_k\} \in W$, for the DPT procedure, too. This means that DPT $(G' \cup \tilde{E})$ will return unsatisfiable.

This completes the proof of Theorem 1.

Hence t[e] is a shared expression for $F_P$ (e), where e denotes $\vee_{e_i \in E} e_i$. An explicit representation of $F_P$ (e) can be obtained by first computing $t[e]=SDP_T(P \cup \tilde{P}, E)$ and then enumerating the cubes over P that make t[e] true.

Below, we instantiate T to be the EUF and DIF theories and show that $SDP_T$ exists for such theories. For each theory, we only need to determine the value of $\text{maxDerivDepth}_T(G)$ for any set of predicates G.

3. SDP for Equality and Uninterpreted Functions

The terms in this logic can either be variables or application of an uninterpreted function symbol to a list of terms. A predicate in this theory is $t_1 \sim t_2$, where $t_i$ is a term and $\sim \in \{=, \neq\}$. For a set G of EUF predicates, G= and G≠ denote the set of equality and disequality predicates in G, respectively. FIG. 7 describes the inference rules for this theory.

Let $\text{terms}(\phi)$ denote the set of syntactically distinct terms in an expression (a term or a formula) $\phi$. For example, $\text{terms}(f(h(x)))$ is $\{x, h(x), f(h(x))\}$. For a set of predicates G, $\text{terms}(G)$ denotes the union of the set of terms in any $g \in G$.

A decision procedure for EUF can be obtained by the congruence closure algorithm 1000 described in FIG. 10.

For a set of predicates G, let $m=|\text{terms}(G)|$. We can show that if we iterate the loop at 820 of FIG. 8 ($DP_T(G)$) for at least 3 m steps, then $DP_T$ can implement the congruence closure algorithm. More precisely, for two terms $t_1$ and $t_2$ in terms(G), the predicate $t_1=t_2$ will be derived within 3 m iterations of the loop at 820 if and only if $EC(t_1)=EC(t_2)$ after process block 1010 (FIG. 10) in the congruence closure algorithm.

Proposition 2. For a set of EUF predicates G, if $m=|\text{terms}(G)|$, then the value of $\text{maxDerivDepth}_T(G)$ for the theory is bound by 3 m.

A proof of Proposition 2 follows.

Proof. We first determine the $\text{derivDepthT}(G)$ for any set of predicates in this theory. Given a set of EUF predicates G, and two terms $t_1$ and $t_2$ in terms(G), we need to determine the maximum number of iterations in process block 820 of $DP_T$ (G) (FIG. 8) to derive $t_1=t_2$ (if G=implies $t_1=t_2$).

Recall that the congruence closure algorithm (described in FIG. 10) is a decision procedure for the theory of EUF. At any point in the algorithm, the terms in G are partitioned into a set of equivalence classes. The operation $EC(t_1)=EC(t_2)$ is used to determine if $t_1$ and $t_2$ belong to the same equivalence class.

One way to maintain an equivalence class $C=\{t_1 1, \ldots, t_n\}$ is to keep an equality $t_i=t_j$ between every pair of terms in C. At any point in the congruence closure algorithm, the set of equivalence classes corresponds to a set of equalities C=over terms. Then $EC(u)=EC(v)$ can be implemented by checking if $u=V \in C=$. This representation allows us to build $SDP_T$ for this theory. Let us implement the C'==merge(C=, $t_1$, $t_2$) operation that takes in the current set of equivalence classes C=, two terms $t_1$ and $t_2$ that are merged and returns the set of equalities C'=denoting the new set of equivalence classes. This can be implemented using the step shown in process block 820 of the DPT algorithm as follows:

1. C'=←C=∪$\{t_1=t_2\}$.
2. For every term $u \in EC(t_1)$, (i.e., $u=t_1 \in C=$), add the predicate $u=t_2$ to C'=by the transitive rule $u=t_2:-u=t_1$, $t_1=t_2$. Similarly, for every $v \in EC(t_2)$, add the predicate $v=t_1$ to C'=by $v=t_1:-v=t_2$, $t_2=t_1$. All these steps can be performed in one iteration.
3. For every $u \in EC(t_1)$ and every $v \in EC(t_2)$, add the edge $u=v$ to C'=by either of the two transitive rules ($u=v:-u=t_2, t_2=v$) or ($u=v:-u=t_1, t_1=v$).
4. Return C'=

If there are m distinct terms in G, then there can be at most m merge operations, as each merge reduces the number of equivalence classes by one and there were m equivalence classes at the start of the congruence closure algorithm. Each merge requires three iterations of the step in process block 820 of the $DP_T$ algorithm to generate the new equivalence classes. Hence, we will need at most 3 m iterations of the step in process block 820 of $DP_T$ to derive any fact $t_1=t_2$ that is implied by G=.

Observe that this decision procedure $DP_T$ for EUF does not need to derive a predicate $t_1=t_2$ from G, if both $t_1$ and $t_2$ do not belong to terms(G). Otherwise, if one generates $t_1=t_2$, then the infinite sequence of predicates $f(t_1)=f(t_2); f(f(t_1))=f(f(t_2)), \ldots$ can be generated without ever converging.

Again, since $\text{maxDerivDepthT}(G)$ is the maximum $\text{derivDepthT}(G')$ for any subset $G' \subseteq G$, and any G' can have at most m terms, $\text{maxDerivDepthT}(G)$ is bounded by 3 m. We also believe that a more refined counting argument can reduce it to 2 m, because two equivalent classes can be merged simultaneously in the $DP_T$ algorithm.

The run time and size of expression generated by $SDP_T$ depend both on $\text{maxDerivDepth}_T(G)$ for the theory and also on the maximum number of predicates in W at any point during the algorithm. The maximum number of predicates in W can be at most $m(m-1)/2$, considering equality between every pair of terms. The disequalities are never used except for generating contradictions. It also can be verified that the size of S(g) (used at 920 in FIG. 9 ($SDP_T$)) is polynomial in the size of input. Hence the run time of $SDP_T$ for EUF and the size of the shared expression returned by the procedure is polynomial in the size of the input.

4. SDP for Difference Logic

Difference logic is a simple yet useful fragment of linear arithmetic, where predicates are of the form $x \triangleright\triangleleft y+c$, where x,y are variables, $\triangleright\triangleleft \in \{<, \leq\}$ and c is a real constant. Any equality $x=y+c$ is represented as a conjunction of $x \leq y+c$ and $y \leq x-c$. The variables x and y are interpreted over real numbers. The function symbol "+" and the predicate symbols $\{<, \leq\}$ are the interpreted symbols of this theory. FIG. 11 presents inference rules for this theory. Constraints like $x \triangleright\triangleleft c$ are handled by adding a special variable $x_0$ to denote the constant 0, and rewriting the constraint as $x \triangleright\triangleleft x_0+c$.

Given a set G of difference logic predicates, we can construct a graph where the vertices of the graph are the variables in G and there is a directed edge in the graph from x to y, labeled with ($\triangleright\triangleleft$, c) if $x \triangleright\triangleleft y+c \in G$. We will use a predicate and an edge interchangeably in this section.

Definition 4. A simple cycle $x_1 \triangleright\triangleleft x_2+c_1, x_2 \triangleright\triangleleft x_3+c_2, \ldots,$ $x_n \triangleright\triangleleft x_1+c_n$ (where each $x_i$ is distinct) is "illegal" if the sum of the edges is $$d = \sum_{i \in [1,n]} c_i$$

and either (i) all the edges in the cycle are ≦ edges and d<0, or (ii) at least one edge is an < edge and d≦0.

It is well known that a set of difference predicates G is unsatisfiable if and only the graph constructed from the predicates has a simple illegal cycle. Alternately, if we add an edge (▷◁c) between x and y for every simple path from x to y of weight c (▷◁ determined by the labels of the edges in the path), then we only need to check for simple cycles of length two in the resultant graph. This corresponds to the rules (C) and (D) in FIG. 11.

For a set of predicates G, a predicate corresponding to a simple path in the graph of G can be derived within lg(m) iterations at 820 of FIG. 8 (the $DP_T$ procedure), where m is the number of variables in G.

Proposition 3. For a set of DIF predicates G, if m is the number of variables in G, then $maxDerivDepth_T(G)$ for the DIF theory is bound by lg(m).

A proof of Proposition 3 follows.

Proof. It is not hard to see that if there is a simple path x ▷◁ $x_1$+c1; $x_1$ ▷◁$_2$ $x_2$+$c_2$, . . . , $x_{n-1}$ ▷◁$_n$ y+$c_n$ in the original graph of G, then after lg(m) iterations, there is a predicate x ▷◁' y+C in W; where $$c = \sum_{i \in [i, n-1]} c_i$$

and ▷◁' is < if at least one of ▷◁$_i$ is < and ≦ otherwise. This is because if there is a simple path between x and y through edges in G with length (number of edges from G) between $2^{i-1}$ and $2^i$, then the algorithm $DP_T$ generates a predicate for the path during iteration i.

However, $DP_T$ can produce a predicate x ▷◁ y+c, even though none of the simple paths between x and y add up to this predicate. These facts are generated by the non-simple paths that go around cycles one or more times. Consider the set G={x<y+1,y<x−2, x<z−1, . . . }. In this case we can produce the fact y<z−3 from y<x−2, x<z−1 and then x<z−2 from y<z−3,x<y+1.

To prove the correctness of the $DP_T$ algorithm, we will show these additional facts can be safely generated. Consider two cases:

(1) Suppose there is an illegal cycle in the graph. In that case, after lg(m) steps, we will have two facts x ▷◁ y+c and y ▷◁ x+d in W such that they form an illegal cycle. Thus $DP_T$ returns unsatisfiable.

(2) Suppose there are no illegal cycles in the original graph for G. For simplicity, let us assume that there are only < edges in the graph. A similar argument can be made when ≦ edges are present. In this case, every cycle in the graph has a strictly positive weight. A predicate x ▷◁ y+d can be generated from non-simple paths only if there is a predicate x ▷◁ y+c ∈ G such that c<d. The predicate x ▷◁ y+d can't be a part of an illegal cycle, because otherwise x ▷◁ y+c would have to be part of an illegal cycle, too. Hence $DP_T$ returns satisfiable.

Note that we do not need any inference rule to weaken a predicate, X<Y+D:−X<Y+C, with C<D. This is because we use the predicates generated only to detect illegal cycles. If a predicate x<y+c does not form an illegal cycle, then neither does any weaker predicate x<y+d, where d≧c.

Complexity of $SDP_T$. Let $c_{max}$ be the absolute value of the largest constant in the set G. We can ignore any derived predicate of the form x ▷◁ y+c from the set W where the absolute value of C is greater than $(m-1)*c_{max}$. This is because the maximum weight of any simple path between x and y can be at most $(m-1)*c_{max}$. Again, let const(g) be the absolute value of the constant in a predicate g. The maximum weight on any simple path has to be a combination of these weights.

Thus, the absolute value of the constant is bound by:

$$C \leq \min\left\{(m-1) * c_{max}, \sum_{g \in G} const(g)\right\}$$

The maximum number of derived predicates in W can be $2*m^2*(2*C+1)$, where a predicate can be either ≦ or <, with $m^2$ possible variable pairs and the absolute value of the constant is bound by C. This is a pseudo-polynomial bound as it depends on the value of the constants in the input.

However, many program verification queries use a subset of difference logic where each predicate is of the form x ▷◁ y or x ▷◁ c. For this case, the maximum number of predicates generated can be $2*m*(m-1+k)$, where k is the number of different constants in the input.

B. Combining SDPs for Saturation Theories

In this section, we provide a method to construct a symbolic decision procedure for the combination of saturation theories $T_1$ and $T_2$, given SDP for $T_1$ and $T_2$. The combination in this example is based on an extension of the Nelson-Oppen (N-O) framework that constructs a decision procedure for the theory $T_1 \cup T_2$ using the decision procedures of $T_1$ and $T_2$.

We assume that the theories $T_1$ and $T_2$ have disjoint signatures (i.e., they do not share any function symbol), and each theory $T_i$ is convex and stably infinite. (We need these restrictions only to exploit the N-O combination result.)

1. Combining Decision Procedures

Given two theories $T_1$ and $T_2$ and the decision procedures $DP_{T1}$ and $DP_{T2}$, the N-O framework constructs the decision procedure for $T_1 \cup T_2$, denoted as $DP_{T1 \cup T2}$.

To decide an input set G, the first step in the procedure is to "purify" G into sets $G_1$ and $G_2$ such that $G_i$ only contains symbols from theory $T_i$ and G is satisfiable if and only if $G_1 \cup G_2$ is satisfiable. Consider a predicate g=̇p($t_1$, . . . , $t_n$) in G, where p is a theory $T_1$ symbol. The predicate g is purified to G' by replacing each sub-term $t_j$ whose top-level symbol does not belong to $T_1$ with a fresh variable $w_j$. The expression $t_j$ is then purified to $t'_j$ recursively. We add G' to $G_1$ and the "binding predicate" $w_j$=̇$t'_j$ to the set $G_2$. We denote the latter as a binding predicate because it binds the fresh variable $w_j$ to a term $t'_j$. Let $V_{sh}$ be the set of shared variables that appear in $G_1 \cap G_2$. A set of equalities Δ over variables in $V_{sh}$ is maintained; Δ records the set of equalities implied by the facts from either theory. Initially, Δ={ }.

Each theory Ti then alternately decides if $DP_{Ti}(G_i \cup \Delta)$ is unsatisfiable. If any theory reports as UNSATISFIABLE, the algorithm returns UNSATISFIABLE; otherwise, the theory $T_i$ generates the new set of equalities over $V_{sh}$ that are implied by $G_i \cup \Delta$. (We assume that each theory has an inference rule for deriving equality between variables in the theory, and $DP_T$ also returns a set of equality over variables.) These equalities are added to Δ and are communicated to the other theory. This process is continued until the set $\Delta$ does not change. In this case, the method returns SATISFIABLE. Let us denote this algorithm as $DP_{T1 \cup T2}$.

Theorem 2. For convex, stably infinite and signature-disjoint theories $T_1$ and $T_2$, $DP_{T1 \cup T2}$ is a decision procedure for $T_1 \cup T_2$.

There can be at most $|V_{sh}|$ irredundant equalities over $V_{sh}$. Therefore, the N-O loop terminates after $|V_{sh}|$ iterations for any input.

2. Combining SDPs

A method of constructing $SDP_{T1 \cup T2}$ by combining $SDP_{T1}$ and $SDP_{T2}$ is now described. The SDPs for each theory are combined modularly, using an extension of the Nelson-Oppen framework. As before, the input to the method is the pair (G, E) and the output is an expression t[e]. The facts in E are also purified into sets $E_1$ and $E_2$ and the new binding predicates are added to either $G_1$ or $G_2$.

To symbolically encode the runs of the N-O procedure for $G' \cup \tilde{E}$, for every $G' \subseteq G$. For any equality predicate $\delta$ over $V_{sh}$, we maintain an expression $\psi\_\delta$ that records the different ways to derive $\delta$ (initialized to false). We also maintain an expression $\psi\_e$ to record the derivations of e (initialized to false).

The N-O loop operates like the case for constructing $DP_{T1 \cup T2}$. The $SDP_{Ti}$ for each theory $T_i$ now takes (Gi$\cup\Delta$, Ei) as input, where $\Delta$ is the set of equalities over $V_{sh}$ derived so far. In addition to computing the (shared) expression t[e] as before, $SDP_{Ti}$ also returns the expression t[($\delta$, TM)], for each equality $\delta$ over $V_{sh}$ that can be derived (see process block 920 of the $SDP_T$ algorithm (FIG. 9).

The leaves of the expressions t[e] and t[($\delta$, TM)] are $G_i \cup \Delta$ (since leaves for $\tilde{E}_i$ are replaced with true). We substitute the leaves for any $\delta \in \Delta$ with the expression $\psi\_\delta$ to incorporate the derivations of $\delta$ until this point. We also update $\psi\_\delta \leftarrow (\psi\_\delta \vee t[(\delta, TM)])$ to add the new derivations of $\delta$. Similarly, we update $\psi\_e \leftarrow (\psi\_e \vee t[e])$ with the new derivations.

The N-O loop iterates $|V_{sh}|$ number of times to ensure that it has seen every derivation of a shared equality over $V_{sh}$ from any set $G'_1 \cup G'_2 \cup \tilde{E}_1 \cup \tilde{E}_2$, where $G'_i \subseteq G_i$.

After the N-O iteration terminates, $\psi\_e$ contains all the derivations of e from G. However, at this point, there are two kinds of predicates in the leaves of $\psi\_e$; the purified predicates and the binding predicates. If G' was the purified form of a predicate $g \in G$, we replace the leaf for G' with $b_g$. The leaves of the binding predicates are replaced with true, as the fresh variables in these predicates are really names for sub-terms in any predicate, and thus their presence does not affect the satisfiability of a formula. Let t[e] denote the final expression for $\psi\_e$ that is returned by $SDP_{T1 \cup T2}$. Observe that the leaves of t[e] are variables in $B_G$.

Theorem 3. For two convex, stably-infinite and signature-disjoint theories $T_1$ and $T_2$, if $t[e] \doteq SDP_{T1 \cup T2}$ (G, E), then for any set of predicates $G' \subseteq G$, eval(t[e], G')=true if and only if $DP_{T1 \cup T2}$ (G'$\cup \tilde{E}$) returns UNSATISFIABLE. Since the theories of EUF and DIF satisfy all the restrictions of the theories of this section, we can construct an SDP for the combined theory that still runs in pseudo-polynomial time.

C. Example Implementation and Experimental Results

This section describes and implementation and experimental results of applying a symbolic decision procedure technique for the combination of EUF and DIF theories. To construct $F_P$ (e), a binary decision diagram (BDD) is built using the Colorado University Decision Diagram package for the expression t[e] (returned by $SDP_T(P \cup \tilde{P}, E)$) and then enumerate the cubes from the BDD. Since the number of leaves of t[e] (alternately, the number of BDD variables) is bound by |P|, the size of the overall BDD is usually small, and is computed efficiently in practice. Moreover, by generating only the prime implicants of $F_P$ (e) from the BDD, we obtain a compact representation of $F_P$ (e). (For any Boolean formula $\phi$ over variables in V, prime implicants of $\phi$ is a set of cubes $C \doteq \{c_1, \ldots, c_m\}$ over V such that $\phi \Leftrightarrow \vee_{c \in C} c$ and two or more cubes from C can't be combined to form a larger cube.)

The results evaluate a symbolic decision procedure-based predicate abstraction method on a set of software verification benchmarks. The benchmarks are generated from the predicate abstraction step for constructing Boolean programs from C programs of Microsoft Windows device drivers in Microsoft's SLAM toolkit. The method is compared with two other methods for performing predicate abstraction. The DP-based method uses the decision procedure ZAPATO, developed by Microsoft Corporation, to enumerate the set of cubes that imply e. Various optimizations (e.g., considering cubes in increasing order of size) are used to prevent enumerating exponential number of cubes in practice. The method based on the UCLID system available from Carnegie Mellon University performs quantifier-elimination using incremental SAT-based methods.

To compare with the DP-based method, we generated 665 predicate abstraction queries from the verification of device-driver programs. Most of these queries had between 5 and 14 predicates in them and are fairly representative of queries in SLAM. The run time of DP-based method was 27904 seconds on a 3 GHz machine with 1 GB memory. The run time of the SDP-based method was 273 seconds. This gives a little more than 100× speedup on these examples, demonstrating that symbolic decision procedure-based techniques can scale much better than other decision procedure based methods.

Figures 12A, 12B:
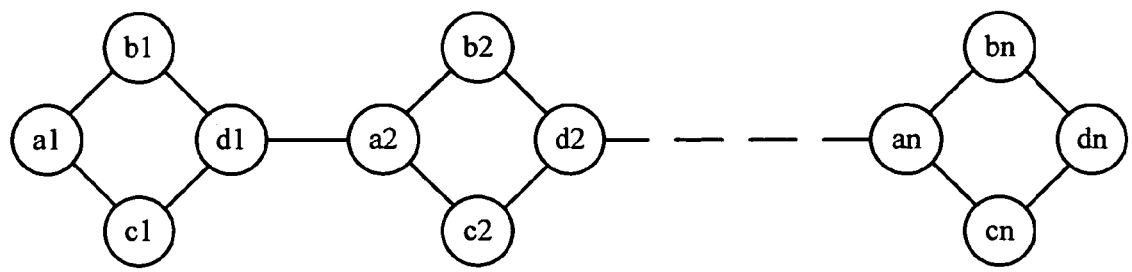
FIGS. 12A and 12B are a graph depicting an expression e (a1=dn) and a table showing experimental results for a comparison of predicate abstraction using symbolic decision procedures and quantifier-elimination methods for the expression represented in FIG. 12A.

To compare with a UCLID-based approach, different instances of a problem were generated where P is a set of equality predicates representing n diamonds connected in a chain and e is an equality a1=dn, as shown in FIG. 12A. Different problem instances were generated by varying the size of n. For an instance with n diamonds, there are 5n−1 predicates in P and 2n cubes in $F_P$ (e) to denote all the paths from a1 to dn. FIG. 12B shows the table 1200 of the results of this comparison. The UCLID-based method was run on a slightly slower, 2 GHz machine. These results illustrate that symbolic decision procedure-based techniques can scale much better than the SAT-based enumeration used in UCLID for this example. (A "−" in table 1200 denotes a timeout of 1000 seconds.) Intuitively, the UCLID-based approach grows exponentially with the number of predicates ($2^{|P|}$), whereas symbolic decision procedure-based techniques only grow exponentially with the number of diamonds ($2^n$) in the result.

III. Computing Environment

The techniques and tools described herein can be implemented on any of a variety of computing devices and environments, including computers of various form factors (personal, workstation, server, handheld, laptop, tablet, or other mobile), distributed computing networks, and Web services, as a few general examples. The techniques and tools can be implemented in hardware circuitry, as well as in software executing within a computer or other computing environment, such as shown in FIG. 13.

Figure 13:
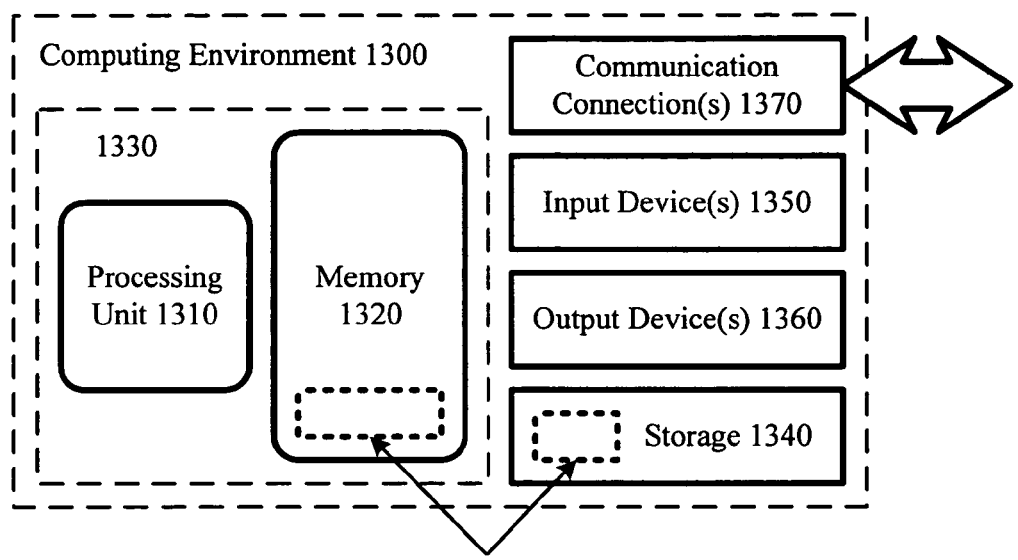
FIG. 13 is a block diagram of a suitable computing environment for implementing described techniques and tools for computer program test generation.

FIG. 13 illustrates a generalized example of a suitable computing environment 1300 in which described techniques and tools can be implemented. The computing environment 1300 is not intended to suggest any limitation as to scope of use or functionality of the invention, as the present invention may be implemented in diverse general-purpose or special-purpose computing environments.

With reference to FIG. 13, the computing environment 1300 includes at least one processing unit 1310 and memory 1320. In FIG. 13, this most basic configuration 1330 is included within a dashed line. The processing unit 1310 executes computer-executable instructions and may be a real or a virtual processor. In a multi-processing system, multiple processing units execute computer-executable instructions to increase processing power. The memory 1320 may be volatile memory (e.g., registers, cache, RAM), non-volatile memory (e.g., ROM, EEPROM, flash memory, etc.), or some combination of the two. The memory 1320 stores software 1380 implementing described predicate abstraction techniques and tools.

A computing environment may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and which can be accessed within the computing environment 1300. For example, the storage 1340 stores instructions for implementing software 1380.

The input device(s) 1350 may be a touch input device such as a keyboard, mouse, pen, or trackball, a voice input device, a scanning device, or another device that provides input to the computing environment 1300. The output device(s) 1360 may be a display, printer, speaker, CD-writer, or another device that provides output from the computing environment 1300.

The communication connection(s) 1370 enable communication over a communication medium to another computing entity. The communication medium conveys information such as computer-executable instructions, audio/video or other media information, or other data in a data signal. By way of example, and not limitation, communication media include wired or wireless techniques implemented with an electrical, optical, RF, infrared, acoustic, or other carrier.

Techniques and tools described herein can be described in the general context of computer-readable media. Computer-readable media are any available storage media that can be accessed within a computing environment. By way of example, and not limitation, with the computing environment 1300, computer-readable media include memory 1320, storage 1340, and combinations of any of the above.

Some techniques and tools herein can be described in the general context of computer-executable instructions, such as those included in program modules, being executed in a computing environment on a target real or virtual processor. Generally, program modules include functions, programs, libraries, objects, classes, components, data structures, etc. that perform particular tasks or implement particular abstract data types. The functionality of the program modules may be combined or split between program modules as desired. Computer-executable instructions may be executed within a local or distributed computing environment.

Having described and illustrated the principles of our innovations in the detailed description and the accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of performing predicate abstraction for a computer program, the method comprising:
   receiving input for predicate abstraction of the computer program; and
   using a symbolic decision procedure, generating a predicate abstraction for the computer program based on the input for predicate abstraction;
   wherein the input for predicate abstraction comprises a set of predicates representing observations of expected behavior of the computer program, and a formula of interest; and
   wherein the symbolic decision procedure comprises a first saturation decision procedure having a first inference rule directed to a first type of logic used to derive a first set of derived predicates, the first saturation decision procedure comprising:
   repeatedly applying the first inference rule to predicates within the set of predicates to derive new predicates; and
   adding the new predicates to the set of predicates;
   such that repeatedly applying the first inference rule to the predicates in the set of predicates is stopped when applying the first inference rule derives no new predicates;
   wherein the first saturation decision procedure further comprises:
   determining if the formula of interest is present in the first set of derived predicates;
   determining that if the formula of interest occurs in the set of predicates then the formula of interest is consistent with the first set of derived predicates; and
   determining that if the formula of interest is not in the first set of derived predicates, then the formula of interest is inconsistent with the first inference rule.

2. The method of claim 1 wherein the set of inference rules comprises at least one inference rule for deriving contradiction.

3. The method of claim 1 further comprising determining that a subset of predicates within the set of predicates is inconsistent with the first inference rule.

4. The method of claim 1 wherein the symbolic decision procedure further comprises a second saturation decision procedure having a second inference rule directed to a second type of logic wherein the second inference rule is repeatedly applied to the predicates in the set of predicates to generate a second set of derived predicates.

5. The method of claim 4 further comprising combining the first saturation decision procedure and the second saturation decision procedure to determine if the formula of interest is valid in the source computer program.

6. A method of performing predicate abstraction for a computer program, the method comprising:

constructing plural saturation-based symbolic decision procedures for a source computer, each procedure having a set of inference rules directed to a type of logic;

modularly combining the plural saturation-based symbolic decision procedures in a combined symbolic decision procedure for the source computer program such that the combined symbolic decision procedure comprises a set of combined inference rules; and using the combined symbolic decision procedure to perform predicate abstraction for the source computer program;

wherein using the combined symbolic decision procedure comprises:

1) using the set of combined inference rules and a first set of predicates, deriving successive new predicates by applying the set of inference rules to the first set of predicates, 2) adding the new predicates to the first set of predicates;

3) repeating 1) and 2) until no new predicates are derived.

7. The method of claim 6 wherein the plural saturation-based symbolic decision procedures comprise at least a symbolic decision procedure for equality and uninterpreted functions.

8. The method of claim 6 wherein the plural saturation-based symbolic decision procedures consist of a symbolic decision procedure for difference logic and a symbolic decision procedure for equality and uninterpreted functions.

9. The method of claim 6 wherein the modularly combining comprises using an extension of a Nelson-Oppen algorithm.

10. A computerized method of performing predicate abstraction for a computer program, the method comprising:

in a saturation-based symbolic decision procedure module, receiving a first set of predicates and a goal expression for the computer program, the saturation-based symbolic decision procedure module comprising a combined saturation-based symbolic decision procedure created from modularly combining two or more saturation-based symbolic decision procedures having different logics with different inference rules, the combined saturation-based symbolic decision procedure comprising a set of inference rules;

storing the goal expression in computer memory;

in the saturation-based symbolic decision procedure module, using the combined saturation-based symbolic decision procedure to symbolically derive a set of derived predicates for the set of inference rules, wherein each predicate out of the set of derived predicates is derived from iterative application of the set of inference rules to the first set of predicates and to predicates which have already been derived in the set of derived predicates until no new predicates are derived;

generating a tree data structure comprising the first set of predicates and derived predicates for the set of inference rules; and based at least in part on the tree data structure generated for the combined saturation-based symbolic decision procedure comprising the derived predicates, extracting a predicate abstraction for the computer program, the predicate abstraction comprising the derived predicates inconsistent with the goal expression according to the different logics.

11. The method of claim 10 wherein the tree data structure further comprises information indicating how the derived predicates were derived from the first set of predicates.

12. The method of claim 10 wherein the extracting the predicate abstraction for the computer program is further based on a binary decision diagram.

* * * * *